United States Patent [19]

Schlachter

[11] Patent Number: 5,564,776

[45] Date of Patent: Oct. 15, 1996

[54] STORAGE ENCLOSURE FOR OPEN LOADBED MOTOR VEHICLE

[76] Inventor: Bradley S. Schlachter, 6211 W. Northwest Hwy., Suite 253D, Dallas, Tex. 75225

[21] Appl. No.: 409,269

[22] Filed: Mar. 23, 1995

[51] Int. Cl.$^6$ ..................................................... B60R 9/06
[52] U.S. Cl. ........................................... 296/37.6; 224/404
[58] Field of Search .......................... 296/37.6, 37.1; 224/402, 403, 404; 108/44

[56] References Cited

U.S. PATENT DOCUMENTS

| | | | |
|---|---|---|---|
| D. 321,159 | 10/1991 | Schlachter | D12/156 |
| 2,136,784 | 11/1938 | Crommey | 296/37.1 |
| 2,740,534 | 4/1956 | Torrent | 296/37.1 |
| 3,393,936 | 8/1966 | Hall | 296/24 |
| 4,199,188 | 4/1980 | Albrecht et al. | 296/100 |
| 4,252,362 | 2/1981 | Campbell | 296/98 |
| 4,375,306 | 3/1983 | Linder | 108/44 |
| 4,451,075 | 5/1984 | Canfield | 296/37.6 |
| 4,749,226 | 6/1988 | Heft | 296/37.6 |
| 4,828,312 | 5/1989 | Kinkel et al. | 296/37.6 |
| 4,938,519 | 7/1990 | Schlachter | 296/37.6 |
| 5,083,829 | 1/1992 | Fonseca | 296/37.6 |
| 5,094,375 | 3/1992 | Wright | 224/404 |
| 5,169,200 | 12/1992 | Pugh | 296/37.6 |
| 5,183,307 | 2/1993 | Chiu, Jr. | 296/24.1 |
| 5,207,469 | 5/1993 | Rossi | 296/37.6 |
| 5,232,259 | 8/1993 | Booker | 224/404 |
| 5,320,397 | 6/1994 | Peterson et al. | 296/57.1 |
| 5,324,089 | 6/1994 | Schlacter | 296/37.5 |

*Primary Examiner*—Gary C. Hoge
*Attorney, Agent, or Firm*—Dennis T. Griggs

[57] ABSTRACT

A storage enclosure for a motor vehicle having a loadbed defined by opposed sidewalls, a load deck and a rear closure, such as a tailgate, includes a generally horizontal top wall extending between the loadbed sidewalls and a depending front wall having a hinged wall portion which may be positioned extending generally horizontally above the deck to form an enclosure space forward of the tailgate when in its closed position. The hinged wall portion may be positioned to extend vertically downwardly from the front wall at its hinge connection to increase the size of the enclosure space defined between the top wall and the load deck, the opposed sidewalls and the tailgate in its closed position. The hinged wall portion may be locked in either working position. The enclosure top wall may be secured to the opposed loadbed sidewalls at stake recesses and the front wall may have opposed recesses to accommodate the loadbed sidewall beam portions. The enclosure is particularly adapted for open loadbed vehicles such as light duty pickup trucks.

18 Claims, 4 Drawing Sheets

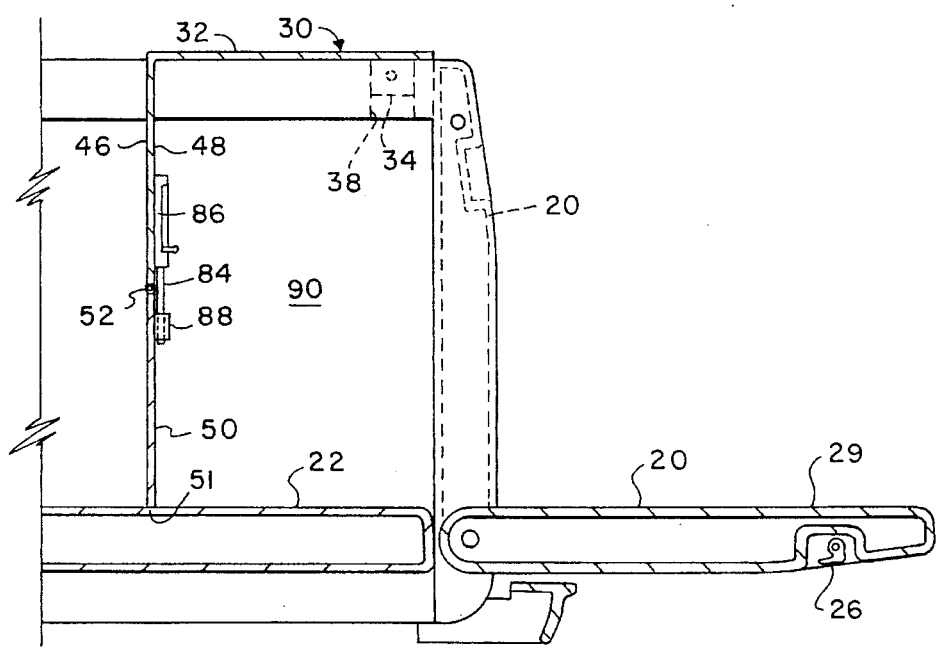
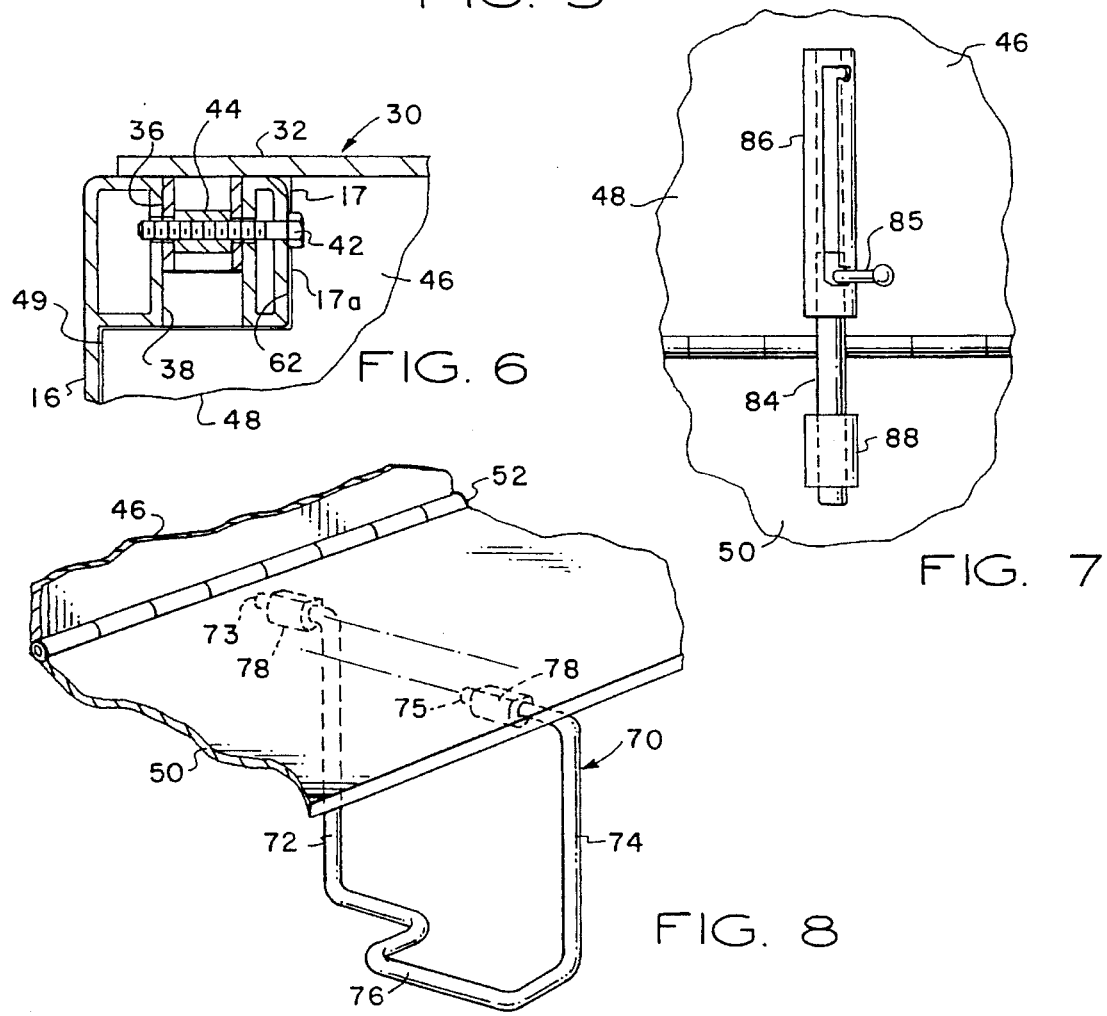

5,564,776

STORAGE ENCLOSURE FOR OPEN LOADBED MOTOR VEHICLE

FIELD OF THE INVENTION

The present invention relates to a storage enclosure or trunk, particularly adapted for use at the rear of an open loadbed motor vehicle such as a light duty or "pickup" truck.

BACKGROUND OF THE INVENTION

A limitation on the use of some utility motor vehicles, including light duty trucks, is the lack of controlled or organized storage space for luggage, tools, equipment, supplies, and any items of value which may require reasonably secure storage and shelter from the elements. The increasingly widespread use of light duty, open loadbed "pickup" trucks by tradesmen as well as for personal transportation vehicles has increased the need for improvements in storage space or "trunks" in such vehicles which may be used for organizing and storing tools, equipment, materials or any article of value which may be desired to be left somewhere other than in the open loadbed or "box" of such vehicles. Certain other types of vehicles such as vans, sport-utility vehicles and station wagons also lack organized, confined storage space adjacent the rear door or tailgate.

DESCRIPTION OF THE PRIOR ART

It is known to provide storage enclosures or trunks for securing portable property such as tools, luggage and equipment on the loadbed of an open utility or light duty truck type vehicle. For example, pickup trucks include a generally rectangular box-like loadbed, and enclosures or security trunks have been developed which mount on the forward portion of the loadbed, just behind the vehicle cab, for example. These enclosures may provide a secure and substantially weather tight space for property but they are difficult to access for loading and unloading property with respect thereto.

It has also been proposed to mount toolboxes or enclosures on the hinged tailgates of vehicles such as pickup trucks, wherein spaced apart stanchions are secured to the tailgate and support a toolbox on trunnions which permit the toolbox to remain in a horizontal or upright position when the tailgate is open or closed. However, the clearance required to maintain such a toolbox in an upright position, regardless of the position of the tailgate, requires the toolbox to occupy a considerable amount of space within the loadbed.

My co-pending U.S. patent application Ser. No. 08/383,107, filed Feb. 3, 1995, discloses and claims certain improvements in tailgate mounted security enclosures for motor vehicles equipped with hinged tailgates. However, it is often desirable to lower the tailgate for insertion or removal of articles which have an overall length substantially the same as or slightly greater than the length of the loadbed itself. Moreover, it is often necessary for tradesmen and craftsmen to be able to use the tailgate inner wall as a work surface while having ready access to tools, equipment and supplies near or adjacent to the tailgate. Still further, it is often important to have the entire load deck of the loadbed or box available for storage of materials, when the tailgate is in an open or closed position and, while the tailgate is in an open position, having it available to use as a work or support surface while having ready access to a storage space for tools and equipment. The above-mentioned front mounted tool boxes or storage enclosures do not satisfy this requirement. Moreover, other prior art enclosures for open loadbed vehicles, such as light duty pickup trucks, as well as other vehicles which are provided with one way or two way tailgates, do not include the advantages which have been sought by certain users of these vehicles. The present invention provides an enclosure which has several of these advantages which are summarized and described in detail hereinbelow.

SUMMARY OF THE INVENTION

The present invention provides a unique storage enclosure or trunk for utility vehicles, including, in particular, light duty open loadbed pickup trucks and other vehicles which have a hinged tailgate disposed at an access opening to the loadbed.

In accordance with one important aspect of the invention, a storage enclosure is provided which is adapted to be mounted on the loadbed or box of a utility vehicle, such as a pickup truck, extending between the sidewalls of the loadbed at the rear access opening thereof and adjacent to a hinged tailgate which forms a closure for the access opening and the enclosure. The enclosure includes a generally horizontal top wall and a depending front wall which has a hinged portion which may extend downward to the load deck in one working position or may be positioned to extend generally horizontally toward the tailgate in a second working position. The enclosure provides storage space for toolboxes, containers, tools, equipment and other articles which are desired to be positioned in a specific secure storage space and not exposed to the elements.

In accordance with another important aspect of the invention, a storage enclosure is provided for a loadbed or cargo compartment of a vehicle which is cooperable with a rear closure, such as a tailgate, to provide a storage space which is only accessible upon opening the tailgate. The enclosure permits utilization of the full length of the load deck of the vehicle, does not interfere with use of the tailgate inside wall as a work or support surface but provides convenient access to articles stored in the enclosure directly adjacent the access opening. The enclosure has two working positions, has unique means for supporting the enclosure on a standard loadbed or box of a utility vehicle or pickup truck and may be secured in both working positions so that access to storage space within the enclosure may only be obtained by opening the vehicle tailgate. The enclosure may also be easily mounted on and removed from a conventional vehicle loadbed.

Those skilled in the art will further appreciate the above-mentioned advantages and superior features of the invention together with other important aspects thereof upon reading the detailed description which follows in conjunction with the drawings.

BRIEF DESCRIPTION OF THE DRAWINGS

FIG. 5 is a section view similar to the section view of FIG. 3 showing the enclosure in the working position of FIG. 4;

FIG. 6 is a detail section view taken from the line 6—6 of FIG. 2;

FIG. 7 is a detail view of a lock mechanism for the hinged part of the enclosure front wall; and FIG. 8 is a detail perspective view of a support bracket for the enclosure hinged wall portion.

DETAILED DESCRIPTION OF A PREFERRED EMBODIMENT

Figure 1:
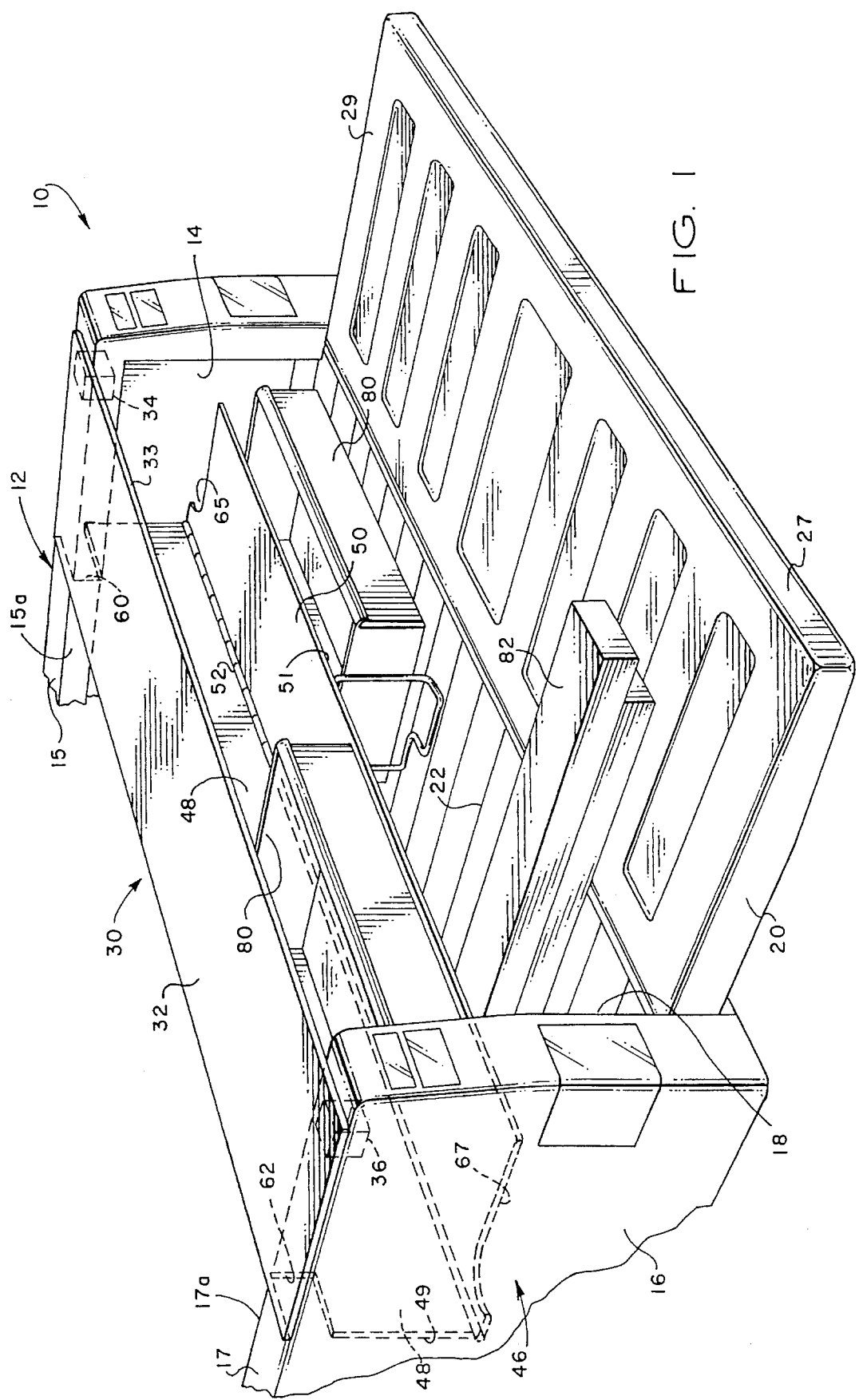
FIG. 1 is a perspective view of the vehicle storage enclosure of the invention shown disposed on the rear portion of an open loadbed, pickup truck.

In the description which follows, like parts are marked throughout the specification and drawing with the same reference numerals, respectively. The drawing figures are not necessarily to scale in the interest of clarity.

Figure 2:
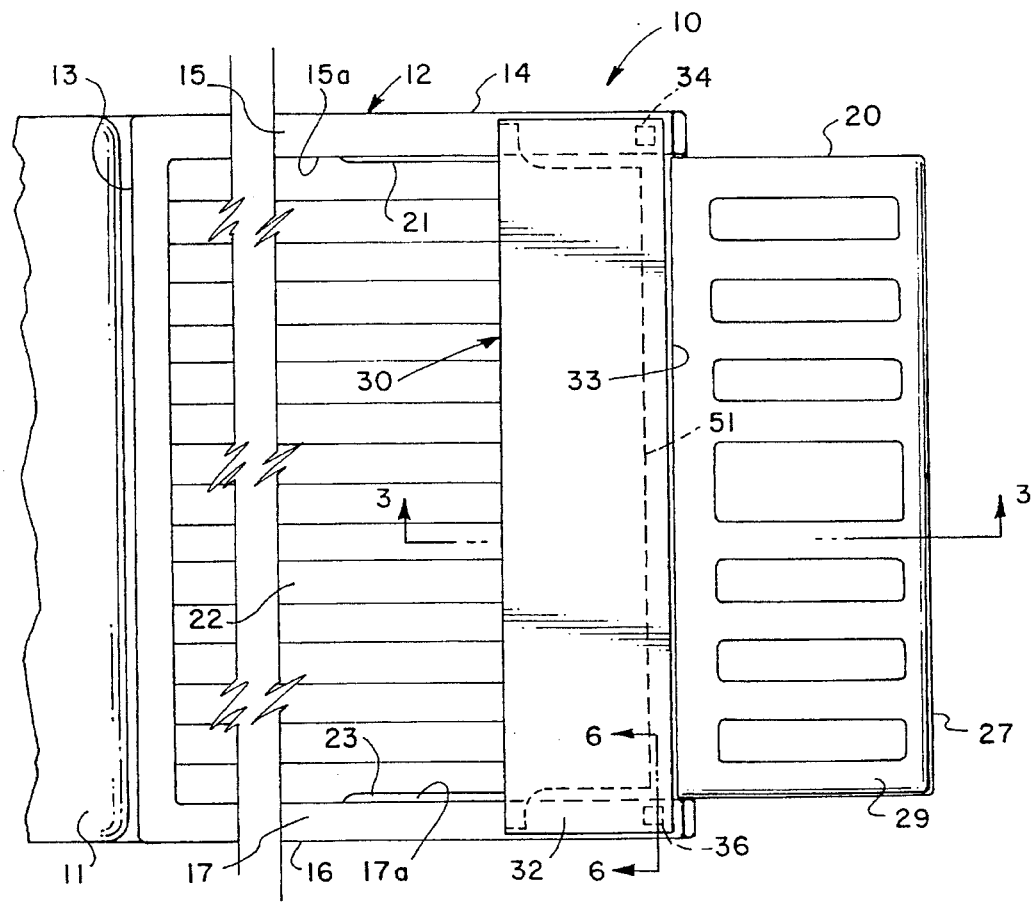
FIG. 2 is a plan view of the enclosure shown in FIG. 1.

Referring to FIGS. 1 and 2, there is shown a portion of a motor vehicle, generally designated by the numeral 10, which is characterized as a light duty or so-called pickup truck. The vehicle 10 has a generally rectangular loadbed or box 12, a portion of which is shown in the drawing figures and is characterized by a front wall 13, FIG. 2, rearward of a cab 11, opposed sidewalls 14 and 16 and a rear access opening 18 between the sidewalls and generally designated by the numeral 18. The access opening 18 may be closed by a hinged tailgate 20 of conventional design which may be moved between a generally horizontal, open position shown in FIG. 1 and a closed position shown by alternate position lines in FIGS. 3 and 5.

The sidewalls 12 and 14 have fabricated longitudinal beam portions extending along their top edges as indicated at numerals 15 and 17. Accordingly, the walls 14 and 16 are actually disposed outwardly from the inner sides 15a and 17a of the beams 15 and 17 so that the transverse width of the loadbed 12 is typically greater than the transverse width of the access opening 18 and the distance between the beam portions 15 and 17.

The loadbed or box 12 also includes a generally horizontal load deck 22 extending between the sidewalls 14 and 16. Rear wheelwells or fenders 21 and 23, FIG. 2, may extend inboard from the sidewalls 14 and 16 as indicated. The tailgate 20 is movable about a hinge axis defined by hinge pins 25, one shown in FIG. 3, between the generally horizontal open position shown in the drawing figures and the alternate or closed position, in a conventional manner. Conventional latch means, not shown, are provided for securing the tailgate in an upright closed position and a latch actuator or handle 26, FIG. 3, may be used to unlatch and move the tailgate 20 from its closed position to its open position. The latch handle 26 may be lockable to prevent unwanted operation of the tailgate 20.

Figure 3:
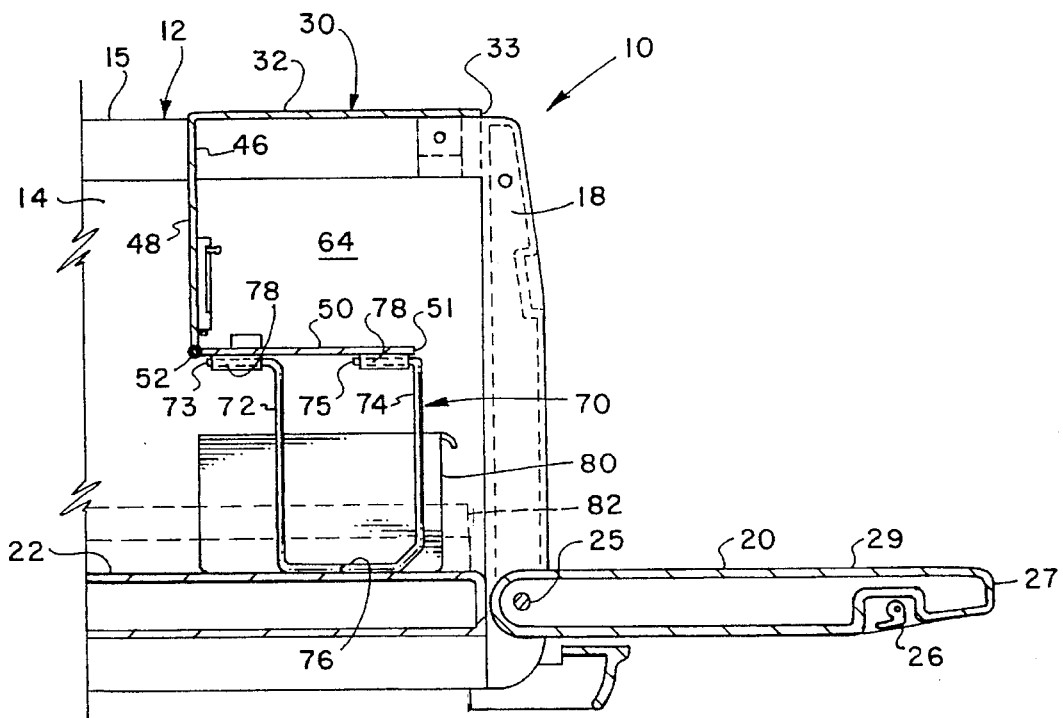
FIG. 3 is a section view taken generally along the line 3—3 of FIG. 2.

Referring further to FIGS. 1 through 3, a unique enclosure for storing tools, equipment, supplies and other materials or articles, is illustrated and generally designated by the numeral 30. The enclosure 30 is adapted to be mounted across the rear portion of the loadbed or box 12 shown in the drawing figures, just forward of the access opening 18. The enclosure 30 includes a generally horizontally extending top wall part 32 which has a width greater than the distance between the beams 15 and 17 so that the wall part may be supported on the top horizontal surfaces of these beams, as illustrated. The top wall part 32 has spaced apart depending bosses 34 and 36 which are adapted to project into loadbed stake receiving openings 38, see FIG. 6 by way of example.

As shown in FIG. 6, the boss 36 may project into opening 38 and be secured by removable pin means, such as a threaded bolt 42, extending at least partially through the beam 17 and threadedly engageable with a cooperating nut portion 44 disposed in the boss 36. In this way the retaining pins 42 are only accessed from within the enclosure space defined by the enclosure 30. Alternatively, the top wall part 32 may be suitably fastened to the horizontal top surfaces of the beams 15 and 17 by suitable threaded fasteners, not shown, or by other suitable means for retaining the top wall part in its working position illustrated in the drawing figures.

The enclosure 30 includes a depending front wall 46 which extends substantially normal to the top wall part 32 and has a portion 48 integrally joined to the top wall part 32. The front wall 46 also includes a movable wall portion 50 which is hinged to the wall portion 48 at suitable hinge means 52. The hinge means 52 may comprise a piano type hinge, as illustrated, for connecting the wall portions 48 and 50 to each other. The depending wall 46 has an overall height which is adapted to bring a lower distal end 51 of the wall portion 50 in close proximity to or even slightly engageable with the load deck 22, as shown in FIG. 5, in one working position of the wall portion 50.

As shown in FIG. 1, the wall part 48 has opposed, generally rectangular notches or recesses 60 and 62, which are dimensioned to be slightly larger than the cross sectional height of the beams 15 and 17. The recesses 60 and 62 have a depth which permits the enclosure 30 to be positioned between the beams 15 and 17 whereby the wall portion 48 extends substantially between the opposed load box sidewalls 14 and 16. Enough clearance may be provided for the recesses 60 and 62 to permit placing the wall part 32 in the position shown with its depending bosses 34 and 36 disposed in the stake receiving openings 38 of the beams 15 and 17 and once these bosses have been secured in the manner described above and shown in FIG. 6, the enclosure 30 cannot be removed from the loadbed 12 without gaining access to the retaining pins or fasteners 42 and removal of same from the bosses 34 and 36, respectively. As shown in FIG. 6, the wall portion 48 extends to the sidewall 16 and is delimited by a side edge 49. The opposite side edge of the wall portion 48 extends to the sidewall 14.

Referring again to FIG. 1 and also FIG. 3, the hinged wall portion 50 is shown in a first working position extending generally horizontally to form an enclosure support floor and a storage space 64 between the top wall part 32, the depending front wall part 48, the opposed loadbed sidewalls 14 and 16 and the tailgate 20 in its closed position. The wall portion 50, as shown in FIG. 1, is preferably relieved along its opposite sides by recesses 65 and 67 to provide clearance for the fenders 21 and 23 when the wall is in its vertical working position to be described in detail herein.

In the working position shown in FIGS. 1, 3 and 8, the hinged wall portion 50 is supported by a formed wire bracket 70 having opposed generally parallel leg portions 72 and 74 and a base 76 which is operable to rest on the load deck 22. The legs 72 and 74 have distal end parts 73, 75, respectively, slidable into bosses 78 formed on the wall portion 50 as shown in FIGS. 3 and 8. The support bracket 70 may be suitably engaged with the bosses 78 at the distal leg parts 73 and 75 to prevent rotation of the bracket out of the vertical position shown and the length of the leg parts 73 and 75 may be such as to prevent removal of the bracket from the bosses except in the direction of the access opening 18 when the tailgate 20 is in an open position.

Accordingly, when the hinged wall portion 50 of the enclosure 30 is in the working position shown in FIGS. 1 and 3 and the tailgate 20 is closed and locked, the enclosure space 64 may be secured against access except by opening the tailgate 20. The space between the distal end 51 of the wall 50 and the tailgate 20 in its closed position may be minimized as desired.

Referring further to FIG. 1, it will be appreciated that the enclosure space 64 is useful for storing many articles including tool or supply boxes 80, for example. At the same time, as shown in FIG. 3, the full length of the loadbed 12 may be utilized for carrying articles such as lumber 82 and such materials may be easily removed from the loadbed when the tailgate 20 is in the open position shown in FIG. 1. Moreover, the inner wall 29 of the tailgate 20 may be advantageously utilized as a work surface which is in proximity to the enclosure space 64 and the tool and supply boxes 80.

Figure 4:
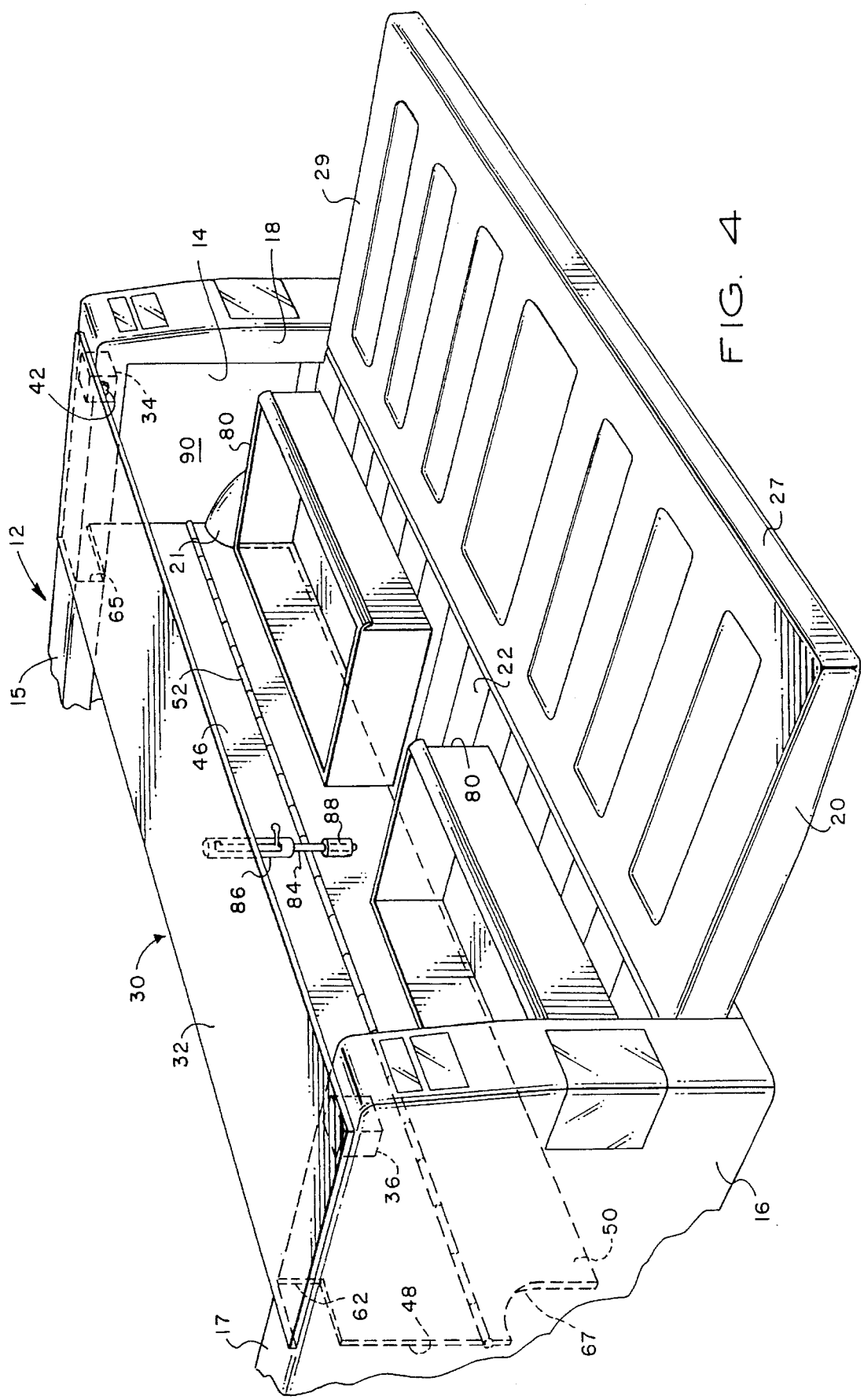
FIG. 4 is a perspective view similar to FIG. 1 showing the enclosure in an alternate working position.

Referring now to FIGS. 4 and 5, an alternate working position of the hinged wall portion 50 is shown wherein the entire front wall 46 extends from the wall part 32 generally vertically toward the load deck 22. The wall portion 50 may be locked in the working position shown in FIGS. 4 and 5 by one or more slidable bolts 84, one shown, mounted on the wall portion 48 in a suitable receiver 86 and slidable into a bolt engaging boss 88 formed on the wall portion 50. As shown in FIG. 7, the bolt 84 may include a suitable operating handle 85 for moving the bolt between its working position to lock the hinged wall portion 50 in the position shown in FIG. 4 and 5 and a retracted position to permit movement of the wall portion to the working position shown in FIGS. 1 and 3. Other suitable means may be utilized to lock the wall portion in the working position shown in FIGS. 4 and 5.

As shown in FIG. 4, the enclosure 30 may provide an enlarged storage space 90 between the top wall part 32, the load deck 22, the opposed loadbed sidewalls 14 and 16, the front wall 46 and the tailgate 20 when the hinged wall portion 50 is in the alternate working position shown in FIGS. 4 and 5. Accordingly, if larger, secure storage space is required and the entire length of the loadbed 12 is not required for material storage, the enclosure 30 may be maintained in the position shown in FIGS. 4 and 5. The bolt 84 is advantageously placed on the side of wall portion 48 facing the space 90 to be accessible only by opening tailgate 20.

The enclosure 30 may be fabricated of a suitable engineering material for use in motor vehicles such as sheet steel or aluminum, or reinforced plastic, for example. The fabrication of the enclosure 30 may be in accordance with conventional manufacturing processes. Installation and removal of the enclosure 30 with respect to a motor vehicle having a loadbed 12 described above for the vehicle 10 or a similar loadbed arrangement is believed to be understandable to those skilled in the art from the foregoing description. The enclosure 30 is proportioned such that, in the closed position of the tailgate 20, such as shown by the alternate position lines in FIGS. 3 and 5, the rear transverse edge 33 of the top wall 32 is contiguous with the top transverse edge 27 of the tailgate. The top wall transverse edge 33 may have a suitable resilient seal strip attached thereto, not shown, for engagement with the transverse edge 27 of the tailgate to form a substantially weather-tight seal, if desired.

The advantages of the enclosure 30 are also believed to be clear to those skilled in the art from the foregoing description. Although a preferred embodiment of the invention has been described in detail herein, those skilled in the art will further recognize that various substitutions and modifications may be made to the invention without departing from the scope and spirit of the appended claims.

What is claimed is:

1. An enclosure for a loadbed of a motor vehicle, said loadbed comprising opposed sidewalls, a load deck, an access opening and a closure movable between open and closed positions with respect to said access opening, said enclosure comprising:

a transverse top wall part adapted to extend between the sidewalls of said loadbed; and a depending front wall connected to said top wall part and spaced from said access opening to define an enclosure space, said front wall including a first wall portion connected to said top wall part and a second wall portion connected to said first wall portion and movable between a first position wherein said enclosure forms a first enclosure space and a second position extending generally parallel to and above said load deck wherein said enclosure forms a second enclosure space.

2. The enclosure set forth in claim 1 including:

means operable to lock said second wall portion in said first position.

3. The enclosure set forth in claim 1 including:

support means for supporting said second wall portion in said second position.

4. The enclosure set forth in claim 3 wherein:

said support means includes spaced apart depending legs, said legs including means for connecting said support means to said second wall portion for supporting said second wall portion in said second position.

5. The enclosure set forth in claim 4 wherein:

said support means includes means cooperable with said second wall portion to prevent disconnecting said support means from second wall portion except by movement of said support means in a direction toward said access opening when said closure is in an open position.

6. The enclosure set forth in claim 1 including:

opposed depending bosses connected to said top wall part and engageable with recess formed in said loadbed, said bosses being cooperable with means for retaining said bosses in said recess to secure said top wall part to said loadbed.

7. The enclosure set forth in claim 1 wherein:

said front wall includes opposed recess cooperable with opposed longitudinally extending portions of said loadbed.

8. An enclosure for providing an enclosed storage space for a motor vehicle having a loadbed, said loadbed being defined by opposed generally parallel sidewalls, a load deck interposed between said sidewalls, means delimiting upper edges of said sidewalls, respectively, a rear access opening interposed between said sidewalls at one end thereof and a closure gate moveable between open and closed positions with respect to said access opening, said enclosure comprising:

a generally horizontally disposed top wall part extending between said sidewalls;

a front wall connected to said top wall part and depending therefrom toward said load deck; and a floor of said enclosure extending generally parallel to and spaced from said load deck and connected to said front wall and cooperable with said front wall, said top wall part, said sidewalls and said closure to form an enclosed storage space on said loadbed, wherein said floor is spaced from said load deck and said enclosure includes support means for supporting said floor above said load deck, and wherein said support means includes spaced apart depending legs and a base interconnecting said legs, said legs including means for connecting said support means to said floor for supporting said floor in said position extending generally parallel to said load deck.

9. The enclosure set forth in claim 8 wherein:

said floor is connected to said front wall by means operable to provide for moving said floor to a generally vertical depending position connected to said front wall to provide an enclosure space defined by said top wall part, said front wall including said floor, said sidewalls, said load deck and said closure for said access opening.

10. The enclosure set forth in claim 9 including:

means operable to lock said floor in said depending position.

11. The enclosure set forth in claim 8 including:

opposed depending bosses connected to said top wall part and engageable with recess formed in said loadbed, said bosses being cooperable with means for retaining said bosses in said recess to secure said top wall part to said loadbed.

12. The enclosure set forth in claim 8 wherein:

said front wall includes opposed recess cooperable with said means delimiting said upper edges of said sidewalls for retaining said enclosure on said loadbed.

13. An enclosure for a loadbed of a pickup truck for disposition adjacent to the rear access tailgate opening of said loadbed, said loadbed comprising a generally horizontal load deck extending between opposed vertical sidewalls, a rear access opening interposed between said sidewalls and a tailgate pivotable between a generally upright closed position and a generally horizontally extending open position, said enclosure comprising:

a generally horizontal top wall part extending between said sidewalls and supported thereon;

a front wall depending from a transverse front edge of said top wall part and connected to said top wall part, said front wall including a first wall portion depending from said top wall part and a second wall portion hinged to said first wall portion and moveable between a generally horizontally extending position and a generally vertically depending position extending between said first wall portion and said load deck; and support means for supporting said second wall portion in said generally horizontally extending position above said load deck whereby said enclosure forms an enclosed storage space defined at least by said top wall part, said first wall portion, said second wall portion, said sidewalls and said tailgate.

14. The enclosure set forth in claim 13 wherein:

said first wall portion includes opposed recess cooperable with opposed longitudinally extending beam portions of said sidewalls, respectively.

15. The enclosure set forth in claim 13 including:

means operable to lock said second wall portion in said depending position.

16. The enclosure set forth in claim 13 wherein:

said support means includes spaced apart depending legs and a base interconnecting said legs, said legs including means for connecting said support means to said second wall portion.

17. The enclosure set forth in claim 16 wherein:

said support means includes means cooperable with said second wall portion to prevent disconnecting said support means from second wall portion except by movement of said support means in a direction toward said access opening when said tailgate is in an open position.

18. The enclosure set forth in claim 13 including:

opposed depending bosses connected to said top wall part and engageable with recess formed in said loadbed, said bosses being cooperable with means for retaining said bosses in said recess to secure said top wall part to said loadbed.

* * * * *